United States Patent [19]

Smart

[11] 4,238,696

[45] Dec. 9, 1980

[54] FAILSAFE ELECTRICAL CIRCUITRY

[75] Inventor: Michael G. Smart, Sunbury on Thames, England

[73] Assignee: G. V. Planer Limited, Sunbury on Thames, England

[21] Appl. No.: 907,326

[22] Filed: May 18, 1978

[30] Foreign Application Priority Data

May 20, 1977 [GB] United Kingdom ............... 21365/77

[51] Int. Cl.³ ....................... H02H 1/06; H03K 5/153
[52] U.S. Cl. ................................307/360; 307/296 R; 307/311; 340/661; 361/90; 361/187
[58] Field of Search .................. 307/200 A, 296, 311, 307/360; 361/90, 187; 340/661, 662, 663; 328/71, 147

[56] References Cited

U.S. PATENT DOCUMENTS

| 3,550,018 | 12/1970 | James et al. | 307/360 X |
| 3,947,669 | 3/1976 | Whitmer | 307/360 |

Primary Examiner—John Zazworsky
Attorney, Agent, or Firm—Young & Thompson

[57] ABSTRACT

A fail safe control circuit in which an input signal for initiating control of a potentially dangerous system is amplified only if it lies between given limits and also only if electrical power is being supplied to the system. The outputs of the amplifiers are monitored to check their correct operation, and two independent optical output signals obtained therefrom. The optical signals are arranged independently to operate switches in the system, such that both switches have to operate before the system can be actuated.

22 Claims, 1 Drawing Figure

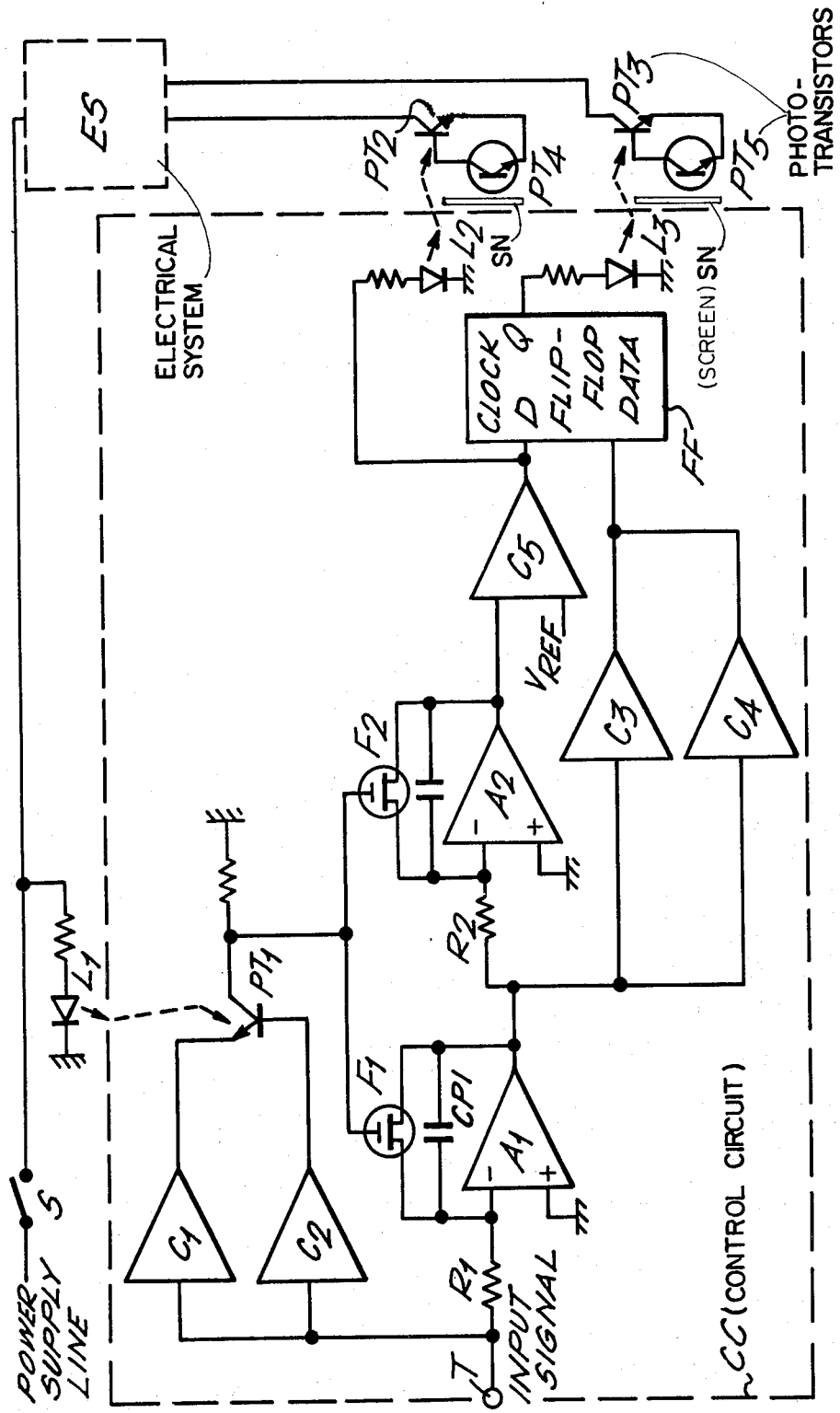

FAILSAFE ELECTRICAL CIRCUITRY

This invention relates to electrical control circuits, and is particularly, though not exclusively concerned with 'fail safe' circuits.

Electrical circuits are now often used to control and initiate potentially hazardous conditions such as the detonation of explosives, the ignition of gas supplies, and the switching of high power electrical circuits. It is most important that the control circuit should operate only under specified, predetermined circumstances. When designing such circuits great consideration must be given to ensuring that the failure of a component (resistor, capacitor, transistor, integrated circuit, etc.) does not result in the circuit initiating the hazardous condition, and preferably the circuit should detect the malfunction and be inhibited from operating—i.e. the system should be 'fail safe'.

In accordance with the present invention, there is provided an electrical control circuit comprising amplifier means arranged to amplify signals received at an input terminal of the circuit, means arranged to inhibit operation of the amplifier means, and comparator means arranged to nullify the inhibiting means in response to the value of said signals lying between two predetermined limits, whereby a control output is derived from the circuit.

Preferably the inhibiting means comprises a depletion mode field effect transistor arrangement.

The amplifier means preferably comprises two series-connected amplifiers, and the output of a first of these may be combined with the output of the other amplifier, preferably after the other output has been passed through a comparator that is conductive only in respect of inputs exceeding a predetermined value. The combined outputs, together with one of the individual amplifier outputs together constitute the control output of the circuit, and this is preferably provided in optical form by means of light-emitting diodes.

Preferably the control circuit is operatively associated with an electrical system to be controlled by opto-electronic switching means. The switching means may comprise the light-emitting diodes of the control circuit in combination with phototransistors of the electrical system, and the phototransistors may be connected to respective further phototransistors which are shielded from the light-emitting diodes but otherwise subject to the same ambient light as the said phototransistors. Spurious operation of the said phototransistors, and thus of the electrical system, is thereby avoided. Preferably two phototransistors and two further phototransistors are employed, independently connecting the control circuit and the controlled system.

Furthermore, the opto-electronic switching means may comprise a light-emitting diode/phototransistor arrangement whereby a light-emitting diode is illuminated only if power is being supplied to the electrical system, and the output from the diode is detected by a phototransistor that interconnects the comparator means and the inhibiting means, whereby the latter means are not nullified if power is not being supplied to the electrical system.

An electrical control circuit and its control of an electrical system, in accordance with the present invention, will now be described, by way of example, with reference to the accompanying drawing.

A control circuit CC has an input terminal T for receiving signals, which are then integrated in two stages, provided certain criteria are met as hereinafter described, and used for initiating operation of an electrical system ES.

The integration is carried out by integrated circuit operational amplifiers $A_1$ and $A_2$ with respective input resistors $R_1$ and $R_2$ and feedback capacitors CP1 and CP2. The integral is computed from prescribed initial conditions, usually zero voltage. If the initial conditions are not held accurately and reliably, at zero for example, the computed value could be in considerable error and hence the system could become operable under potentially unsafe conditions. To compute the integral accurately the integrating amplifiers $A_1$ and $A_2$ are held short circuited to prevent the capacitors CP1 and CP2 from being charged until certain conditions, as set out below, are satisfied, indicating that the system ES may be allowed to operate. Depletion mode field effect transistors (FET's) $F_1$ and $F_2$ provide short circuiting of the integrating capacitors CP1 and CP2 respectively, and contribute to the fail safe characteristics of the circuit. These FET's are conducting when no voltage is applied thereto, and need a control voltage on the gate terminal to turn them off (whereas enhancement FET's and bipolar transistors require a voltage or current to turn them on). Hence, the control circuit CC is prevented from operating if there is a loss of power supply to the FET's $F_1$ and $F_2$.

The FET's $F_1$ and $F_2$ are arranged to operate only in response to three input signals, thereby providing an AND gate control for these devices. An integrated circuit device is not chosen for this function, since it could result in a non fail safe arrangement due to the output of the gate failing in the 'on' condition without all the inputs being present. The conditions which have to be met for the integrating amplifiers $A_1$ and $A_2$ to be unclamped are that the input signal at terminal T must fall between predetermined limits and that a mechanical switch S in the power supply line to the system ES is closed.

The first two conditions are detected by two integrated circuit comparators $C_1$ and $C_2$ and the last by a phototransistor $PT_1$ which is illuminated by a light-emitting diode $L_1$ powered from the system supply line, and suitably poled to be conductive on supply of power through the switch S. The two comparators $C_1$ and $C_2$ have open collector outputs and are connected to the emitter and base terminals respectively of the phototransistor $PT_1$ to form the 3-input AND gate. Comparator $C_1$ senses when the input signal at terminal T is above a predetermined minimum level, its output being connected to the emitter of the phototransistor $PT_1$ so as to be in series therewith. Comparator $C_2$ senses when the input signal at terminal T is below a predetermined maximum level, its output transistor being 'off' in this case. If the input signal is above the maximum level, comparator $C_2$ short circuits the base of the phototransistor $PT_1$ preventing it from being turned on by illumination from diode $L_1$. A phototransistor is used for two reasons in this position. It allows the state of the mechanical switch S to be easily detected without complex circuitry to shift the voltage level to that of the control circuit and eliminates the possibility of device failure affecting the power supply line or bypassing the mechanical switch. Also, the control circuit CC can be physically isolated from the power supply, by use of a suitable insulating barrier of transparent material, for example. With the circuit as described the failure of any one part does not result in the FET's $F_1$ and $F_2$ being turned off and thereby allow the integrating amplifiers $A_1$ and $A_2$ to drift and produce a false output.

Thus the control circuit CC is designed so that it can only start to operate under the correct conditions and cannot be initiated by a component or circuit failure. Once the circuit is operating it is necessary to check that the integrating amplifiers are functioning correctly. This is possible with the present circuit since it is known that the input signal at terminal T must be within certain limits in a correctly operating circuit. The input signal is monitored, as described, to effect the unclamping of the amplifiers. The output of amplifier $A_1$ is also monitored using two comparators $C_3$ and $C_4$, and these are arranged to give an output signal only when the output of the amplifier $A_1$ lies between limits that have previously been calculated as occurring at that stage of the circuit as a result of the input signal at terminal T being between its predetermined limits. The most significant point during the computation at which to check the operation of the circuit is when the output of amplifier $A_2$ reaches a preset valve, as determined by a comparator, having a reference second input. If the output of the amplifier $A_1$ is within its calculated limits, it is implied that the control circuit CC is operating correctly since the input signal at terminal T must also be within its predetermined limits, since the integrating amplifiers $A_1$ and $A_2$ are unclamped. The logical function of this self-checking circuitry can be implemented using a D-type flip flop FF. The output of the comparators $C_3$ and $C_4$ monitoring the integrator $A_1$ is used as the 'data' input and the output of the comparator $C_5$ is used to 'clock' the flip flop FF. This arrangement also protects against a failure mode of the final comparator $C_5$ which would result in a signal being produced to initiate operation of the controlled system ES irrespective of the correct operation of the rest of the circuit CC. The system ES is arranged so that it requires two inputs before it can operate. The two inputs are the output of the comparator $C_5$ and the output of the flip flop FF which is only 'true' if the preceding part of the control circuit CC has functioned correctly. These two signals are not combined in a conventional AND gate, since the safety of the control circuit CC would then depend solely on this element, but instead independently control the supply of power to two inter-dependent parts of the subsequent circuitry of the controlled system ES. These signals are optically coupled to the subsequent circuitry by respective light-emitting diode and phototransistor switch combinations $L_2,PT_2$ and $L_3,PT_3$ to allow physical isolation and the elimination of possible bypass paths in the event of component failures.

If the system is designed so that it may be physically spaced apart at these points it is necessary to protect against the situation where the phototransistors $PT_2$ and $PT_3$ are turned on by ambient light. This can be done by connecting further phototransistors, $PT_4$ and $PT_5$, across the base-emitter junction of the phototransistor $PT_2$ and $PT_3$ respectively, so that the former will also be illuminated by ambient light and thus short circuit the photocurrent generated in phototransistors $PT_2$ and $PT_3$, thereby keeping them turned off. The phototransistors $PT_4$ and $PT_5$ are physically positioned so that they are shielded from the light output of the diodes $L_2$ and $L_3$ by screens SN.

I claim:

1. An electrical control circuit comprising an input terminal; first amplifier means arranged to amplify signals received at said input terminal and to provide an output in accordance therewith; first inhibiting means arranged to inhibit operation of said first amplifier means; second amplifier means arranged to receive as an input said output of said first amplifier means and to provide an output in accordance therewith; second inhibiting means arranged to inhibit operation of said second amplifier means; first comparator means arranged to nullify said first and second inhibiting means in response to the value of said signals received at said input terminal lying between two predetermined limits; second comparator means arranged to receive said output of one of said first and second amplifier means and to be conductive in response to the value of said one amplifier means output lying between two predetermined limits; and third comparator means arranged to receive said output of the other of said first and second amplifier means and to be conductive in response to said other amplifier means output exceeding a predetermined value; said electrical control circuit deriving from said signals received at said input terminal a control output comprising signals derived from conduction of said second and third comparator means.

2. A control circuit according to claim 1, wherein said second comparator means is arranged to receive the output of said first amplifier means, and said third comparator means is arranged to receive the output of second amplifier means.

3. A control circuit according to claim 1, wherein said first and second inhibiting means each comprises a depletion-mode field-effect transistor.

4. A circuit according to claim 1, for use as a fail-safe control circuit for an electrical system, comprising a light-emitting diode arranged to be energized on supply of electrical power to said electrical system, and a phototransistor associated with said diode, said phototransistor being electrically connected in series between said first comparator means and said first and second inhibiting means and arranged to be conductive thereby to nullify said first and second inhibiting means only when said light-emitting diode is energized simultaneously with the value of said signals at said input terminal lying between two predetermined limits as determined by said first comparator means.

5. A control circuit according to claim 1, comprising flip-flop means arranged to be conductive in response to output signals received from both the second and third comparator means to provide, together with said output signals of said third comparator means, said control output of the circuit.

6. A control circuit according to claim 5, wherein said flip-flop means is a D-type flip-flop.

7. A circuit according to claim 6, for use as a fail-safe control circuit for an electrical system, comprising light-emitting diodes arranged to be energized in response to output signals of said flip-flop means and said third comparator means respectively, and respective phototransistors associated with said light-emitting diodes, whereby conduction by said phototransistors provides said control output enabling operation of said electrical system.

8. A circuit according to claim 7, comprising further transistors electrically connected across respective ones of said phototransistors, and means screening said further phototransistors from said light-emitting diodes, thereby to eliminate the effect of ambient light incident on said phototransistors.

9. A control circuit according to claim 7 wherein the amplifier means comprises two amplifiers in series with each other and the inhibiting means comprises two inhibiting arrangements associated with respective ones of the amplifiers.

10. A control circuit according to claim 9, wherein each inhibiting arrangement comprises a depletion mode field effect transistor.

11. A control circuit according to claim 9, wherein further comparator means is arranged to receive output signals from one of the amplifiers and to be conductive in response to the value of said output signals lying between two predetermined limits.

12. A control circuit according to claim 1, comprising flip-flop means arranged to be conductive in response to output signals recieved from both the further comparator means and said comparator.

13. A control circuit according to claim 12, wherein said flip-flop means is a D-type flip-flop.

14. A control circuit according to claim 11, wherein said further comparator means comprises two comparators connected in parallel with each other.

15. A control circuit according to claim 7, wherein the control output is in optical form.

16. A control circuit according to claim 15, wherein the optical output is derived from light-emitting diode means.

17. An electrical system comprising
switch means for conducting electrical power thereto, first light-emitting diode means conductive on closure of said switch, two independent phototransistor switch means, said system being operable only on conduction by said three switch means; the system further comprising
an input terminal for receiving signals for deriving optical outputs for supply to said phototransistor means,
amplifier means for amplifying signals received at said input terminal,
depletion mode field effect transistor means arranged to inhibit operation of the amplifier means,
first comparator means for receiving said input signals and providing a nullifying signal for switching off said field-effect transistor means when the value of said input signals is between predetermined limits,
further phototransistor means arranged to conduct said nullifying signal in response to light from said first light-emitting diode means, thereby to enable operation of said amplifier means,
second comparator means for conducting a first output signal from said amplifier means when said first output signal lies between predetermined limits,
third comparator means for conducting a second output signal from said amplifier means when said output signal exceeds a predetermined value,
flip-flop means connected to receive said first and second output signals from the second and third comparator means respectively, and to provide an output signal in response thereto,
second light-emitting diode means for deriving an optical output response to said second output signal of said third comparator means,
third light-emitting diode means for deriving an optical output in response to said output signal of said flip-flop means,
and wherein said two phototransistor switch means each comprises a pair of phototransistors, one phototransistor of one said pair being exposed to said second light-emitting diode means and the other phototransistor of said one pair being shielded from said second light-emitting diode means, one phototransistor of the other said pair being exposed to said third light-emitting diode means and the other phototransistor of said other pair being shielded from said third light-emitting diode means, each said other phototransistor of said pairs shutting off its respective said one phototransistor upon the receipt of ambient light thereby to prevent spurious operation of said phototransistor switch means.

18. A fail-safe control circuit for an electrical system, comprising an input terminal; two integrating amplifiers connected to one another in series and arranged to amplify signals received at said input terminal; a respective depletion-mode field-effect transistor arranged to inhibit operation of said amplifiers; first and second comparators arranged to provide output signals in response to the value of said input terminal signals being respectively above and below predetermined lower and upper values; a light-emitting diode arranged to be energized when electrical power is supplied to said electrical system; and a phototransistor, the phototransistor being connected so as to be electrically conductive when supplied with said output signals of both said comparators and light from said light-emitting diode, whereby said amplifiers integrate said input terminal signals and generate a control output enabling operation of said electrical system.

19. A fail-safe control circuit for an electrical system comprising an input terminal; amplifier means arranged to amplify signals received at said input terminal; inhibit means arranged to inhibit operation of said amplifier means; two comparators arranged to provide output signals to nullify said inhibit means in response to the value of said input signals being respectively above and below predetermined lower and upper values; light-emitting diode means arranged to receive said amplified signals from said amplifier means and to derive an optical output therefrom; and phototransistor means arranged to receive said light output and to derive therefrom a control output for enabling operation of said electrical system.

20. An electrical system according to claim 19, wherein said phototransistor means has associated therewith further phototransistor means, and means shielding said further phototransistor means from said optical control output, so as to cancel the effect of any ambient light.

21. An electrical system according to claim 19, wherein said light-emitting diode means comprises two independent light-emitting diodes, and said phototransistor means comprises two phototransistors associated with respective ones of the light-emitting diodes.

22. An electrical system according to claim 19, wherein said inhibiting means comprises depletion mode field effect transistor means.

* * * * *